(12) United States Patent
Herold et al.

(10) Patent No.: US 6,761,140 B2
(45) Date of Patent: Jul. 13, 2004

(54) INTAKE SYSTEM FOR AN INTERNAL COMBUSTION ENGINE

(75) Inventors: Armin Herold, Althuette (DE); Joerg Miroll, Koengen (DE); Berndt Schuetz, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 135 days.

(21) Appl. No.: 10/218,217

(22) Filed: Aug. 13, 2002

(65) Prior Publication Data

US 2003/0034001 A1 Feb. 20, 2003

(30) Foreign Application Priority Data

Aug. 16, 2001 (DE) .......................................... 10140314

(51) Int. Cl.$^7$ .............................................. F02B 31/00
(52) U.S. Cl. .............................. 123/188.14; 123/184.21
(58) Field of Search ........................... 123/184.21, 306; 251/228, 298, 299, 304; 261/DIG. 52

(56) References Cited

U.S. PATENT DOCUMENTS 1,922,407 A  * 8/1933 Teeter ....................... 261/34.2
5,477,823 A    12/1995 Uchida

* cited by examiner

Primary Examiner—Noah P. Kamen
(74) Attorney, Agent, or Firm—Klaus & Bach

(57) ABSTRACT

In an intake system for an internal combustion engine having a cylinder head with at least one inlet duct per cylinder, an essentially flat control flap is supported in the inlet duct on a pivot shaft pivotally about an axis which is disposed in spaced relationship upstream from the control flap by way of side support arms such that, in an open position, the control flap rests against a wall portion of the inlet duct from where it can be swiveled into the intake duct into a flow directing turbulence generating position.

8 Claims, 5 Drawing Sheets

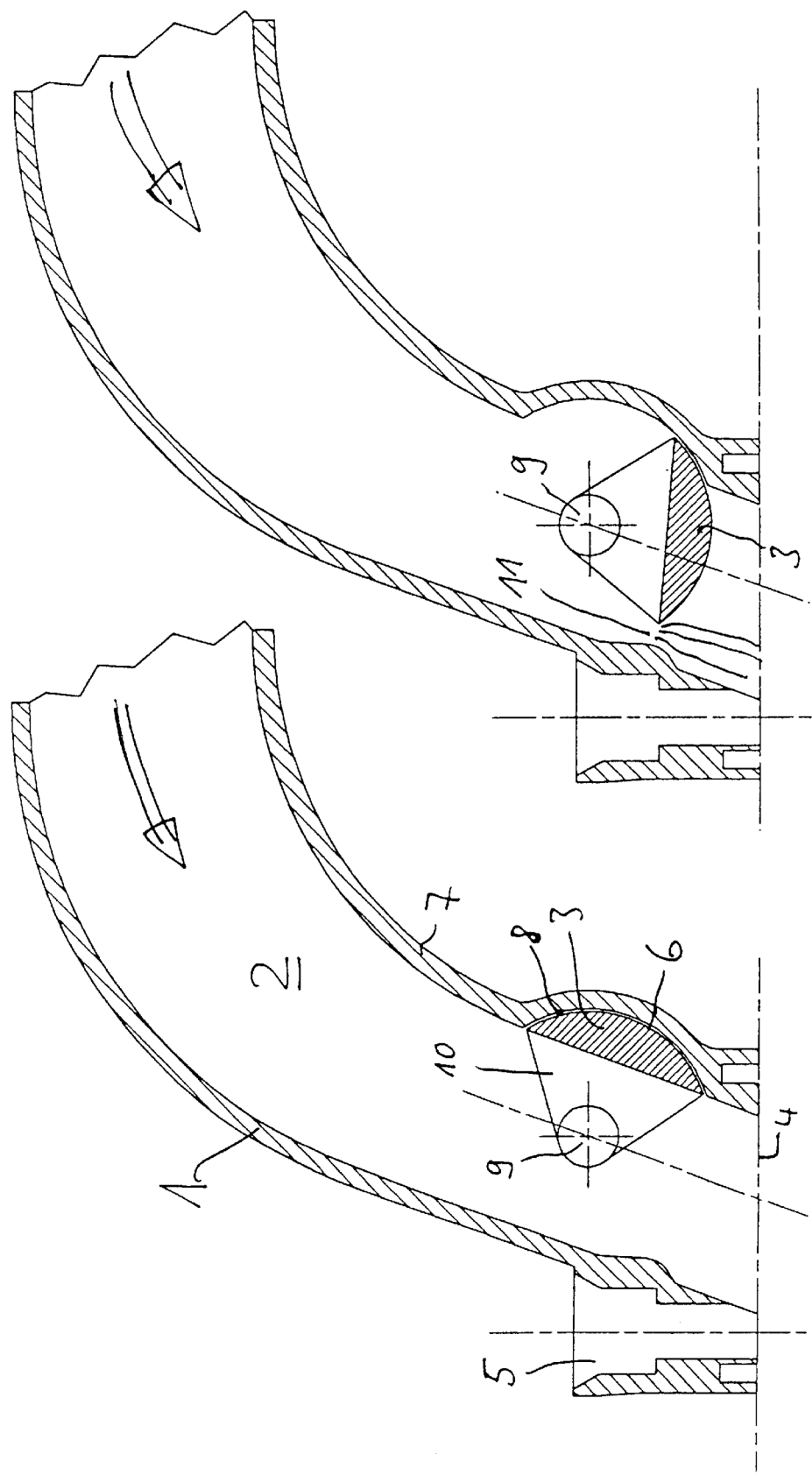

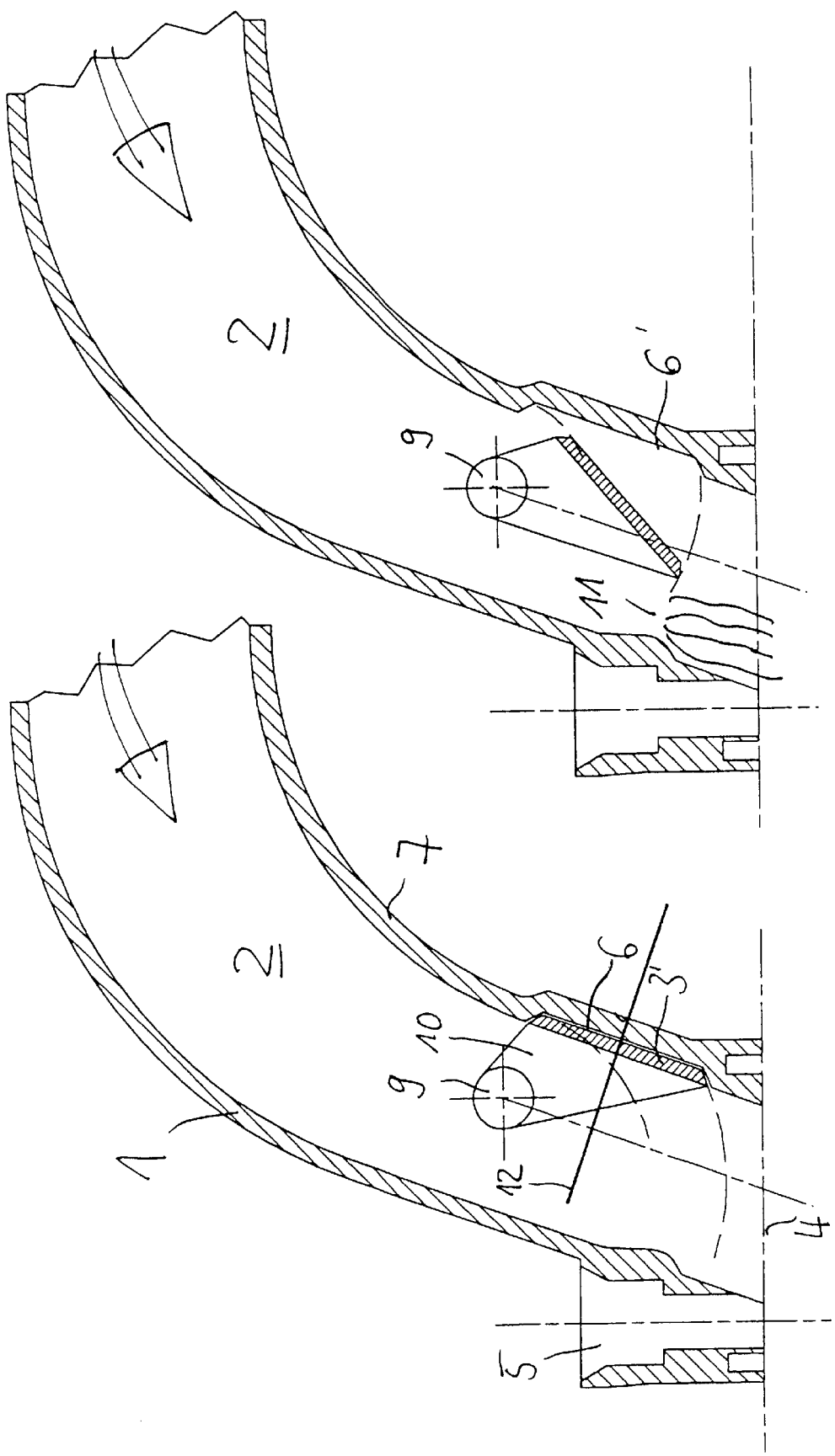

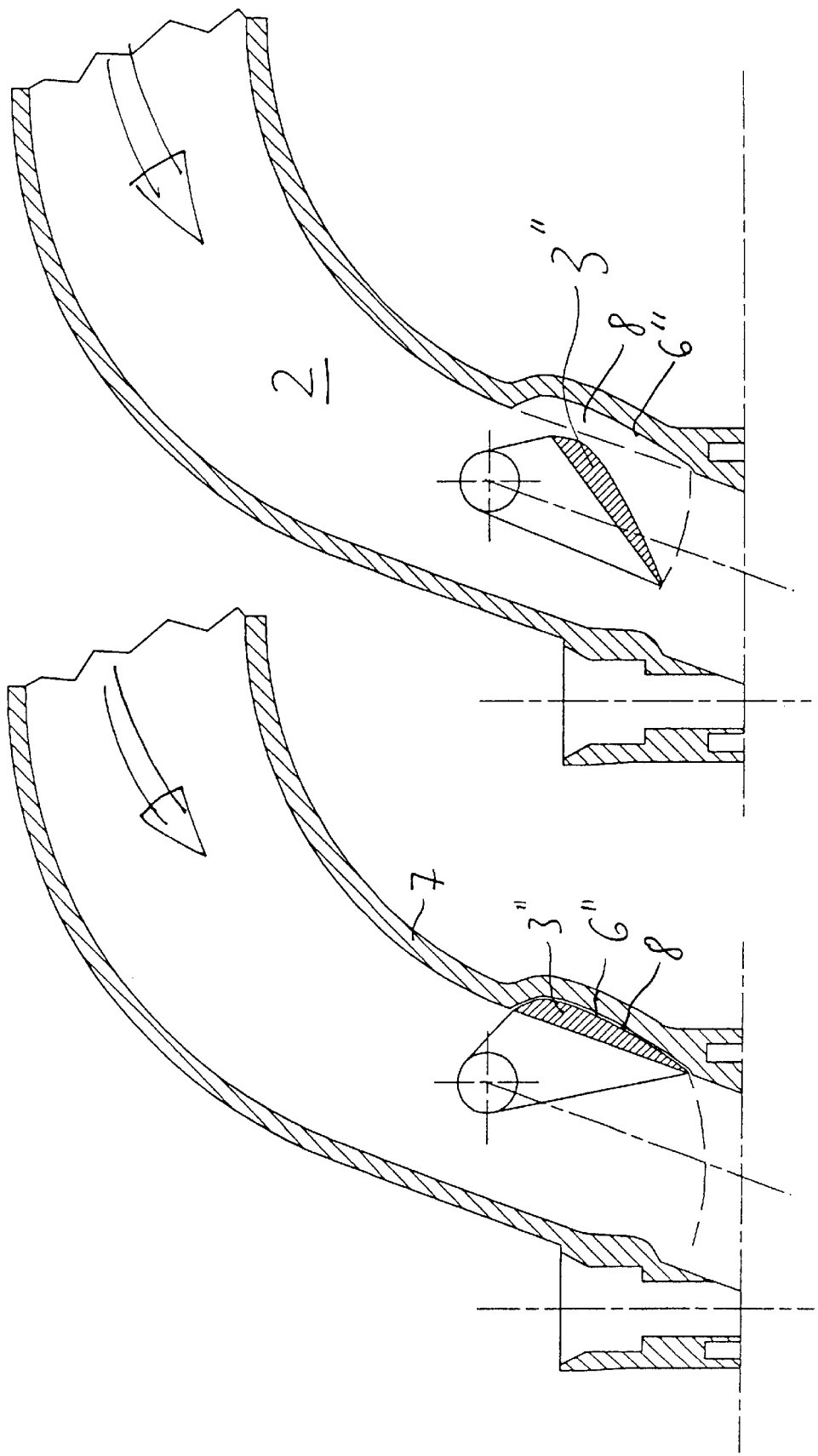

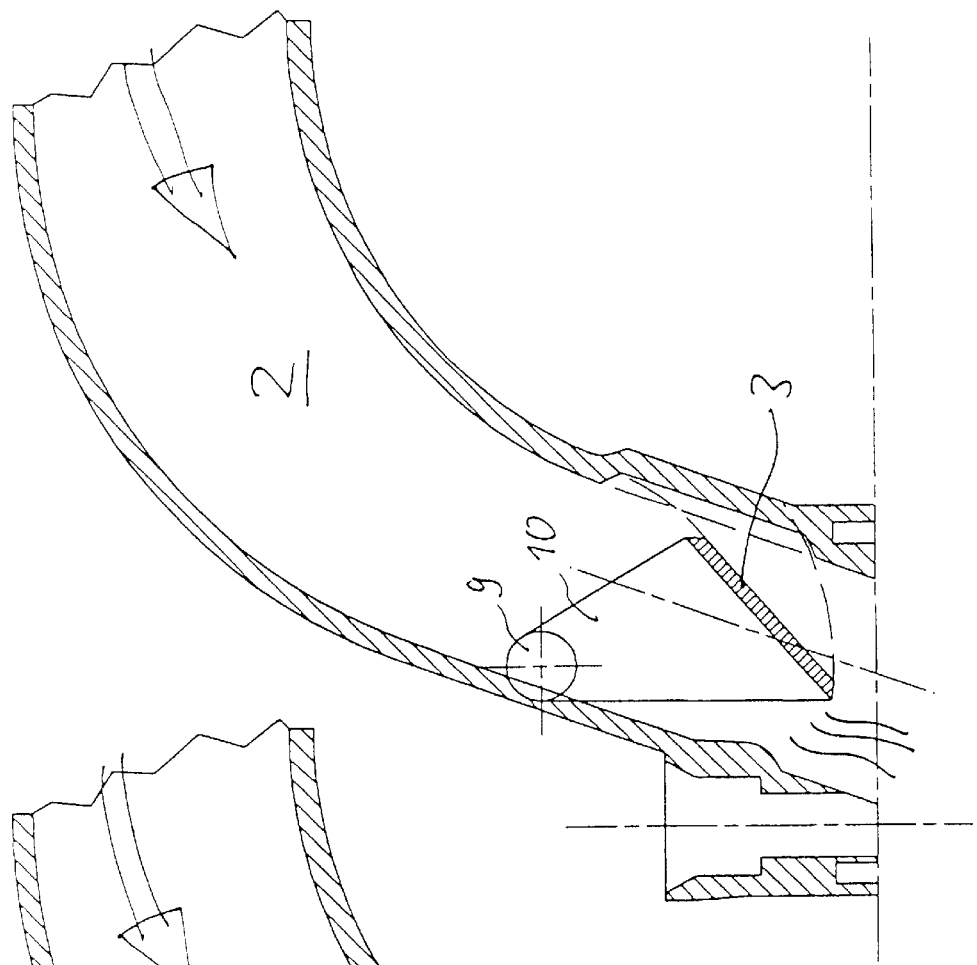
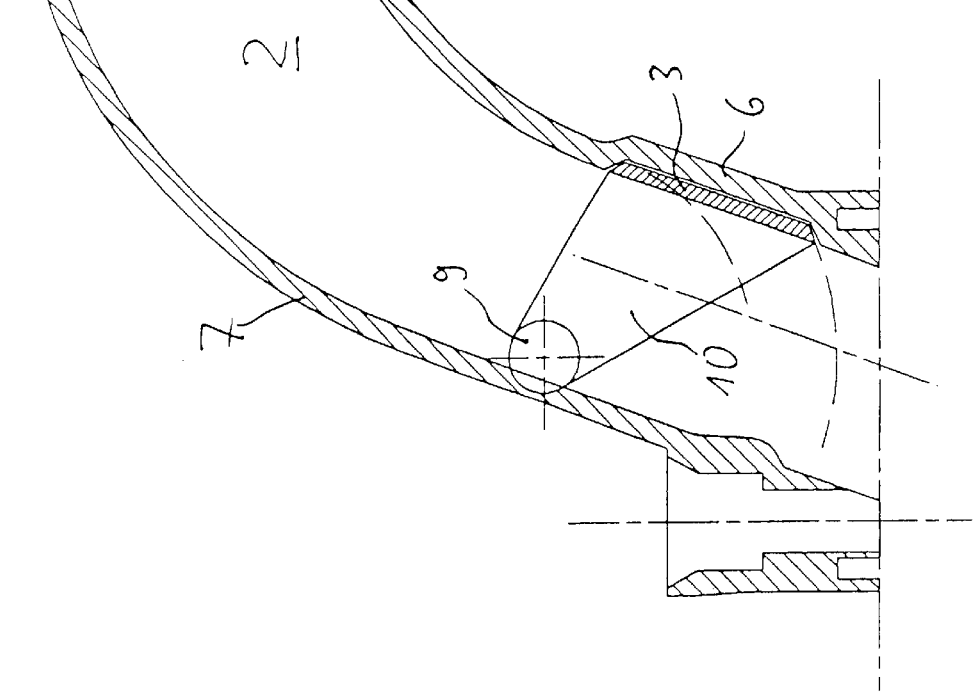

though the dimension of the control flap transverse to
the flow direction of course depends on the cross-section
of the inlet duct.

INTAKE SYSTEM FOR AN INTERNAL COMBUSTION ENGINE

BACKGROUND OF THE INVENTION

The invention relates to an intake system for an internal combustion engine having a cylinder head with an inlet duct including a control flap, which is pivotally supported for controlling the gas flow through the inlet duct.

U.S. Pat. No. 5,477,823 discloses an intake system for an internal combustion engine that has a cylinder head with one inlet duct per cylinder, which branches downstream into component ducts leading to different inlet valves. A flange part with a control flap for the purpose of generating turbulence in the inlet duct is supported upstream of the cylinder head mounting flange. The control flap is supported on a roller rotatably mounted slightly eccentrically in the flange part. In an opened position, the flap closes a dead volume in the flange part in such a way that the flap is flush with the duct wall. In the closed position, the control flap projects partially into the dead volume and partially into the inlet duct in order to generate there a turbulent flow that leads to a tumbling flow in the combustion chamber of the associated cylinder.

It is the object of the invention to provide a control flap with improved flow properties while reducing the expenses and space requirements for the design.

SUMMARY OF THE INVENTION

In an intake system for an internal combustion engine having a cylinder head with at least one inlet duct per cylinder, an essentially flat control flap is supported in the inlet duct on a pivot shaft pivotally about an axis which is disposed in spaced relationship upstream from the control flap by way of side support arms such that, in an open position, the control flap rests against a wall portion of the inlet duct from where it can be swiveled out into the intake duct into a flow directing, turbulence generating position.

When the control flap is not intended to generate turbulence, it is located in such a way that it hinders the flow in the inlet duct as little as possible. In a turbulence-generating position, which is set in certain ranges of the engine performance graph in order to generate a non-uniform flow profile over the cross-section of the inlet duct, the control flap is pivoted into the flow of the inlet duct. A non-uniform flow profile over the cross-section of the inlet duct causes what is referred to as tumbling flow in the combustion chamber, which results in advantages during combustion with respect to exhaust gas emissions and fuel consumption. A tumbling flow has a cylindrical flow pattern in the combustion chamber about an axis perpendicular to the axis of the cylinder. The pivot axis of the control flap which lies outside the surface of the control flap, is preferably arranged upstream of the control flap because this allows a relatively small actuating force and simple stabilization of the control flap in the flow by virtue of the air flow forces effective on the control flap.

It is advantageous if the control flap has no pivot shaft in the region of the flow. This can be achieved if the pivot shaft is disposed and supported only in the wall of intake duct or the flange part thereof. Within the intake duct, only side portions of the flap, that is support arms, extend to the ends of pivot shaft sections projecting from the wall at each side of the control flap. The side portions or support arms are shaped in such a way that they rest smoothly against the wall of the inlet duct when the control flap is closed. Impairment of the flow in the intake pipe due to the pivot shaft is thereby avoided.

As a refinement of the invention, the control flap is designed in such a way that it rests snugly against a wall of the inlet duct when it is in an open position. This reduces impairment of the flow in the inlet duct when the control flap is in the open position.

Preferably, the control flap rests in a niche in the wall of the inlet duct in its fully open position. As a result, the maximum possible flow cross of the intake duct is provided in the open position of the control flap and the flow in the inlet duct is not impaired.

In a further refinement of the invention, the control flap and the wall or niche for receiving the opened control flap are shaped in such a way that there is only a very small gap between the niche and the control flap in an open position of the control flap. This has the advantage that only a small flap volume in the wall or niche has to be filled or emptied during the actuation of the control flap. If the flap volume is only very small due to the small space, only a very small quantity of fuel or particles from recirculated exhaust gas can collect in the gap. Careful ventilation of the air gap ensures that deposits of whatever kind, that could accumulate in the space when the flap is open, are swept away by the air flow through the space and that clogging of the space by baked-on or boiled-on deposits is avoided.

In a further refinement of the invention, the pivot shaft of the control flap is arranged in such a way that it does not intersect a normal, that is, a line perpendicular to the centroid of the control flap. Since the resultant pressure force of the inlet duct flow acts on the centroid, self-amplification of the movement of the flap into a position for turbulence or in the direction of an opened position is possible in a simple way by moving the pivot axis of the control flap away from a line extending through the centroid and normal to the plane of the control flap. In this case, the actuating force required to move the control flap in a turbulence-generating direction is reduced, that is, a self-amplification is achieved.

On the other hand, the actuating force required to move the flap into the open position is increased over the force required with the pivot axis extending through the normal line on the centroid.

In still a further refinement of the invention, the pivot axis of the control flap lies outside the center of the inlet duct. Eccentric arrangement of the pivot axis makes it possible to provide any lever length between the control flap and the pivot axis, that is, different force ratios between the adjusting force at the pivot axis and the force resulting from the pressure of the flow on the control flap can be established.

In a particular embodiment of the invention, the pivot shaft of the control flap is disposed close to the duct wall of the inlet duct, more specifically on the side that lies opposite the niche for receiving the opened control flap. This arrangement of the pivot results in a long lever arm between the pivot axis and the control flap. Furthermore, the pivot shaft, together with the control flap, can be mounted in the flange part from the outside in an insert without the need for the pivot shaft to extend through the inlet duct in the flange part.

Preferably, the control flap is aerodynamically shaped. This means that the flap has a certain flow profile in order to achieve flow control without completely closing the inlet duct at one side. The flow profile is such that the flow in the inlet duct is directed toward one side of the inlet duct and generates a tumbling flow in the combustion chamber of the internal combustion engine. At the same time, an aerodynamic configuration of the control flap has a lower resistance and hence results in a smaller throttling loss for the air flow. By virtue of the aerodynamic configuration, the control flap can be made smaller while achieving the same effect.

Further features and combinations of features will become apparent from the description and the drawings. Concrete exemplary embodiments of the invention are illustrated in simplified form in the drawings and explained in greater detail in the following description.

BRIEF DESCRIPTION OF THE DRAWINGS

FIG. 1 shows a control flap according to the invention in a fully open position, FIG. 2 shows the control flap according to the invention in accordance with FIG. 1 in a turbulence-generating flow control position, FIG. 4 shows a control flap according to the invention wherein the pivot axis of the flap extends through the center of an inlet duct, in a fully open position, FIG. 5 shows the control flap according to FIG. 4 in a turbulence-generating position, FIG. 6 shows a control flap according to the invention with the pivot axis extending through the center of an inlet duct in a fully open position, FIG. 7 shows the control flap according to FIG. 6 in a turbulence-generating position, FIG. 8 shows a control flap according to the invention with a pivot disposed outside the center of an inlet duct in a fully open position, and FIG. 9 shows a control flap according to FIG. 8 in a turbulence-generating position.

DESCRIPTION OF PREFERRED EMBODIMENTS

Figure 3:
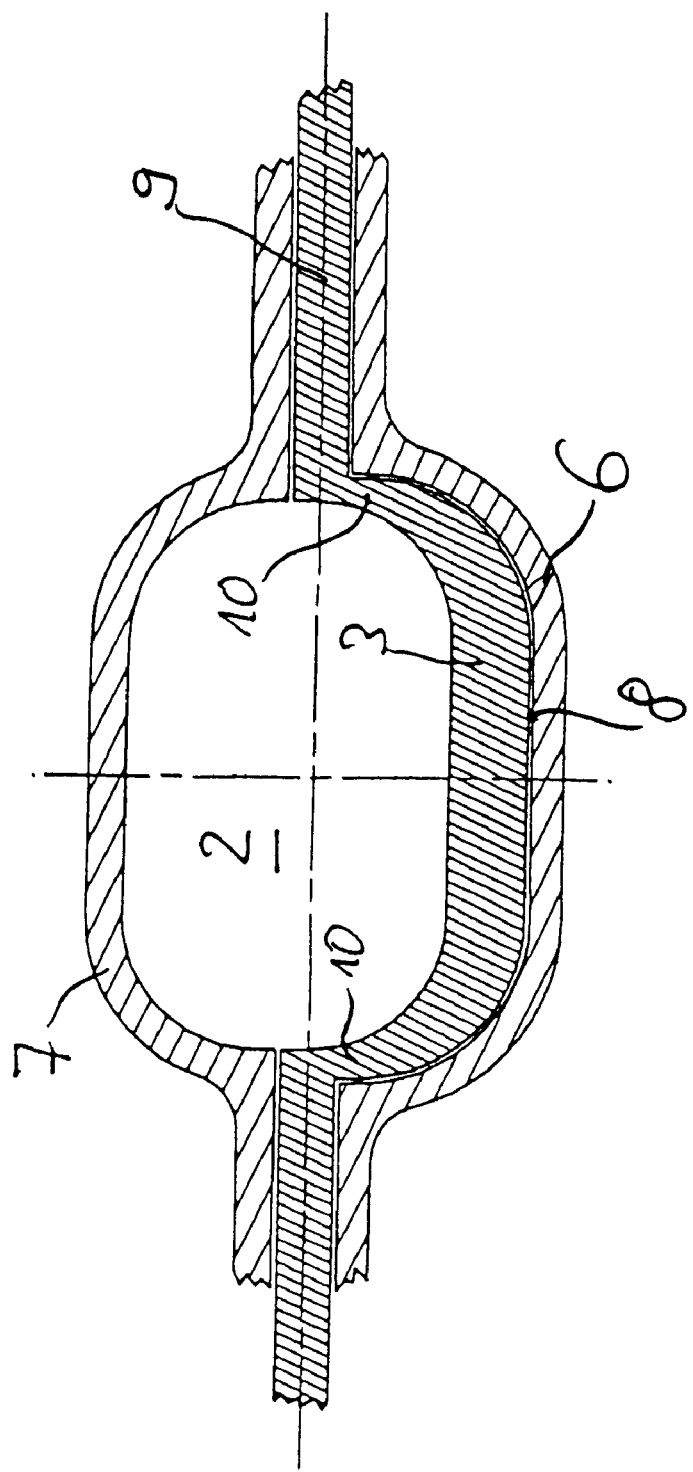
FIG. 3 shows a control flap according to the invention in a fully open position, viewed in the direction of flow.

An intake system 1 of an internal combustion engine (not shown) with an inlet duct 2 and a control flap 3 is shown schematically in FIG. 1. The intake system 1 has a flange surface 4 and a mounting structure 5 for a fuel injection valve (not shown). The intake system 1 is connected at the flange surface 4 to a cylinder head (not shown), which includes passages extending up to the inlet valves of the respective cylinder. In an open position, the control flap 3 rests in a niche 6 in the wall 7 of the inlet duct 2. The niche 6 has an arcuate contour to ensure that the air gap 8 between the niche and the control flap 3 is minimal. The axis of the pivot shaft 9 of the control flap is disposed in the center of the inlet duct 2. The control flap 3 is connected to the pivot shaft 9 by means of side arms 10 and has a cross-section area in the form of a circular segment. In an open position, the control flap 3 does not pose any significant resistance to the flow in the inlet duct 2.

FIG. 2 shows schematically the intake system 1 of an internal combustion engine (not shown) with the inlet duct 2 and the control flap 3 in a turbulence-generating position. The control flap 3 is shown rotated into the position for maximum turbulence, with the result that there is only a small flow cross-section 11 open for the inlet flow. In this position, a turbulent flow is generated in the inlet-duct zone between the control flap 3 and the inlet valve (not shown), which flow extends along the duct wall opposite the niche 6. In this closed position, the pivot shaft 9 of the control flap 3 is upstream of the control flap.

In FIG. 3, the control flap 3 with side arms 10 and pivot shaft 9 is shown viewing it in the direction of the flow in the inlet duct. The control flap 3 is open and rests in the niche 6 in the wall 7 and, with the latter, forms a gap 8. The pivot shaft 9 of the control flap 3 does not project from the wall of the inlet duct 2 or only to an extent such that the flow is not hindered or disturbed. There is a sufficiently strong connection between the shaft and the control flap via the side arms 10.

FIG. 4 shows schematically an intake system 1 of an internal combustion engine (not shown) with an inlet duct 2 and a control flap 3'. The intake system 1 again includes a flange surface 4 and a support structure 5 for a fuel injection valve (not shown). The intake system 1 is connected at the flange surface 4 to a cylinder head (not shown), which extends the inlet duct 2 up to the inlet valves. In an open position, the control flap 3' rests in a niche 6' in the wall 7 of the inlet duct 2. Since the control flap 3 is flat and, at the same time, the pivot 9 of the control flap is upstream of the control flap, even in the closed postion, the niche 6' is flat as well and it is easy to minimize the air gap 8. The axis of the shaft pivot 9 of the control flap is disposed in the center of the inlet duct 2. The control flap 3' is connected to the pivot shaft 9 by means of side arms 10. Because the axis of the pivot shaft 9 does not intersect a normal 12 through the centroid of the control flap 3' but intersects the center of the duct upstream of the normal 12, the air flow in the inlet duct 2 generates a restoring force that pivots the control flap in the opening direction, that is, toward the niche 6'. This facilitates control and provides for stabilization of the opening position of the control flap 3'.

In FIG. 5, the flat control flap 3' shown in FIG. 4 is shown in a turbulence-generating position. The control flap 3' has been pivoted out of the niche 6' and hinders the airflow in the inlet duct 2. In this turbulence-generating position, the axis of the pivot shaft 9 of the control flap 3' is disposed upstream of the control flap. A large part of the airflow is made turbulent by the narrow gap 11 between the control flap 3' and the wall opposite the niche 6' and flows along this wall of the inlet duct 2 up to the inlet valve (not shown).

FIG. 6 shows a control flap 3" similar to that shown in FIG. 4, but this flap has an aerodynamic rear side—that is to say, the side of the control flap 3" that faces away from the flow or points toward the wall 7 in the niche 6" has a flow dynamic profile that promotes flow through the air gap 8 thereby cleaning the air gap 8 in the niche 6" even at a minimum angle of opening of the control flap 3".

FIG. 7 shows the air flap 3" of FIG. 6 in an open position similar to that in FIG. 5. Because of the aerodynamic profile of the control flap 3", the air flow through the air gap 8 is likewise directed to the opposite side of the inlet duct 2 from the niche 6" in order to generate what is referred to as a tumbling flow in the combustion chamber (not shown).

FIGS. 8 and 9 show a control flap 3' similar to the control flap in FIGS. 4 and 5 in an open position (FIG. 8) and in a turbulence-generating position (FIG. 9). In this embodiment, wherein the pivot shaft is disposed close to the opposite wall 7 of the inlet duct 2 from the niche 6', particularly large lever arms 10 are formed between the control flap 3' and the pivot shaft 9. The long lever arms offer advantages for the control and stabilization of the opening of the control flap 3'. The flow conditions in the inlet duct 2 are similar to those in FIGS. 4 and 5.

What is claimed is:

1. An intake system for an internal combustion engine comprising a cylinder head with at least one inlet duct (2) per cylinder mounted to a flange surface (4) of said cylinder head, said intake system including an essentially flat control flap (3, 3') supported in said inlet duct (2) on a pivot shaft (9) pivotally about an axis which is disposed in spaced relationship upstream from said control flap (3, 3'), said control flap (3, 3') having side support arms (10) extending upstream to said pivot shaft (9) and being arranged such that, in an open position, said control flap (3, 3') rests against a wall portion (7) of said inlet duct (2) from which it can be swiveled out into said intake duct (2) into a flow directing turbulence-generating position.

2. An intake system for an internal combustion engine according to claim 1, wherein said pivot shaft (9) extends from said side support arms (10) outwardly so that there is no restriction in the inlet duct (2) in the region of the flow through the inlet duct.

3. An intake system for an internal combustion engine according to claim 1, wherein said wall portion (7) includes a niche (6) sized so as to snugly receive said control flap (3, 3') when said flap is in said open position.

4. An intake system for an internal combustion engine according to claim 3, wherein there is only a small air gap between the control flap (3, 3') and the wall (7) in said niche (6).

5. An intake system for an internal combustion engine according to claim 3, wherein the pivot axis (9) of the control flap (3) is disposed outside of the center of the inlet duct (2).

6. An intake system for an internal combustion engine according to claim 5, wherein the pivot axis (9) of the control flap (3) extends close to a wall section of the inlet duct (2) opposite said niche (6) for receiving the opened control flap (3).

7. An intake system for an internal combustion engine according to claim 3, wherein the control flap (3) is aerodynamically shaped.

8. An intake system for an internal combustion engine according to claim 1, wherein said control flap (3') has a centroid and said pivot axis of said control flap (3') extends in spaced relationship from a normal (12) to said control flap (3') through the centroid of the control flap (3').

* * * * *